(12) United States Patent
Jackson

(10) Patent No.: US 7,286,556 B1
(45) Date of Patent: Oct. 23, 2007

(54) LOCAL AREA NETWORK WITH ELECTROCHEMICAL POWER SOURCE

(75) Inventor: Stephen S. Jackson, Chapel Hill, NC (US)

(73) Assignee: Nortel Networks Limited (CA)

( * ) Notice: Subject to any disclaimer, the term of this patent is extended or adjusted under 35 U.S.C. 154(b) by 987 days.

(21) Appl. No.: 09/752,152

(22) Filed: Dec. 29, 2000

(51) Int. Cl.
    *H04L 12/413* (2006.01)
(52) U.S. Cl. .......... 370/445; 370/450; 370/425
(58) Field of Classification Search .......... 370/445, 370/446, 447, 449, 450, 422, 423, 425; 713/300, 713/310, 320, 340; 340/310.01
    See application file for complete search history.

(56) References Cited

U.S. PATENT DOCUMENTS

| | | | | |
|---|---|---|---|---|
| 5,652,892 A | * | 7/1997 | Ugajin | 713/310 |
| 5,838,989 A | * | 11/1998 | Hutchison et al. | 710/11 |
| 5,923,663 A | * | 7/1999 | Bontemps et al. | 370/445 |
| 5,990,577 A | * | 11/1999 | Kamioka et al. | 307/26 |
| 6,295,356 B1 | * | 9/2001 | De Nicolo | 379/413 |
| 6,348,874 B1 | * | 2/2002 | Cole et al. | 340/825.01 |
| 6,535,983 B1 | * | 3/2003 | McCormack et al. | 713/310 |
| 6,640,308 B1 | * | 10/2003 | Keyghobad et al. | 713/300 |
| 6,643,566 B1 | * | 11/2003 | Lehr et al. | 700/286 |

OTHER PUBLICATIONS

Brooks, Rick, "White Paper on the subject of the AC coupled diode discovery method", adapted from a class project: Santa Clara University, COEN233 Discovery/Power for Ethernet, pp. 1-21, Jul. 2000.

* cited by examiner

*Primary Examiner*—Bob A. Phunkulh
(74) *Attorney, Agent, or Firm*—McGuinness + Manaras LLP

(57) ABSTRACT

A power integrated local area network, such as an Ethernet network, is disclosed. The network comprises: a plurality of member network devices; and a central network device configured to communicate with the plurality of member network devices, and to deliver power, from energy stored in an electrochemical power source, to at least one selected member network device that is capable of accepting power from the central network device.

44 Claims, 3 Drawing Sheets

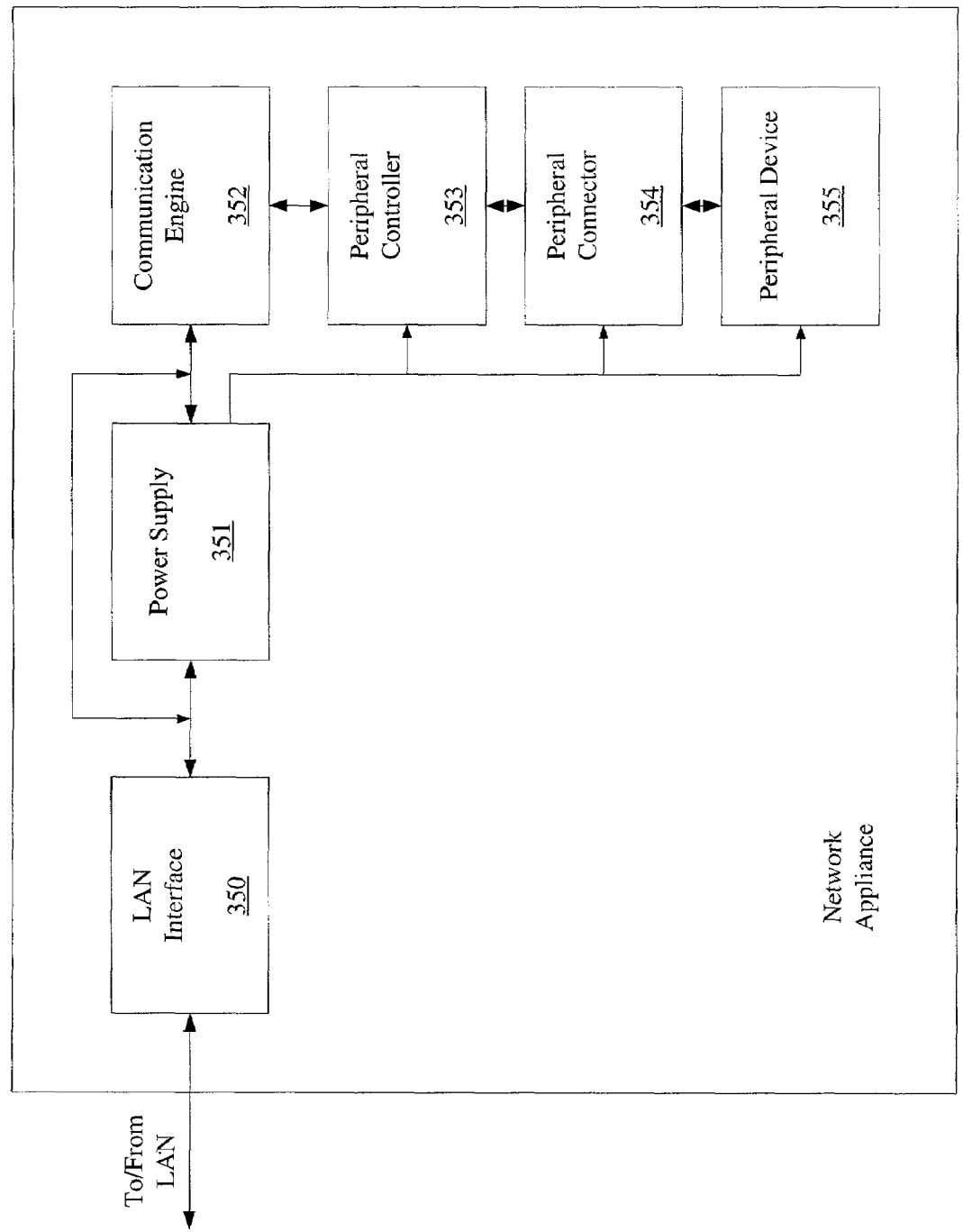

LOCAL AREA NETWORK WITH ELECTROCHEMICAL POWER SOURCE

FIELD OF THE INVENTION

The invention generally relates to systems and methods for providing power to local area networks and, more particularly, the invention relates to systems and methods for creating a power integrated local area network.

BACKGROUND OF THE INVENTION

Local area networks are known that deliver both power and data to member computer systems. There is a continuing need, however, for techniques that facilitate widespread use of such networks.

SUMMARY OF THE INVENTION

In one embodiment of the invention, a central network device for use in a power integrated local area network comprises: an electrochemical power source; and a network interface configured to communicate with a plurality of member network devices and to deliver power, from energy stored by the electrochemical power source, to at least one selected member network device, the selected member network device being capable of accepting power over the power integrated local area network.

In another embodiment of the invention, a power integrated local area network comprises: a plurality of member network devices; and a central network device configured to communicate with the plurality of member network devices, and to deliver power, from energy stored in an electrochemical power source, to at least one selected member network device that is capable of accepting power from the central network device.

In a further embodiment of the invention, a central network device for use in a power integrated local area network comprises: networking logic, configured to communicate with a plurality of member network devices; and electrochemical power source means for providing power to at least one selected member network device, the selected member network device being capable of accepting power over the power integrated local area network.

In a further method according to an embodiment of the invention, a method for powering a local area network using power from a central network device comprises: selecting at least one member network device capable of accepting power over the local area network; and providing power, from energy stored by an electrochemical power source, to the at least one selected member network device.

In further detailed embodiments, the power integrated local area network is configured to execute the Ethernet protocol, and may operate according to a Power Ethernet Standard. Additionally, the local area network may deliver power and data through an MDI-X compliant port. The networking logic may be a switch, a hub, a router, or a multiplexer. The central network device may comprise power rectification circuitry such as an AC to DC converter or a DC to DC converter. The electrochemical power source may comprise a rechargeable battery, which may be charged by the AC to DC converter, and which may provide power to a DC to DC converter that is in turn configured to power the member network devices. The electrochemical power source may be configured to provide backup power to the member network devices in the event of an interruption of delivery of primary power to the central network device.

In other detailed embodiments, the plurality of member network devices may comprise a network appliance. The network appliance may comprise: a peripheral device configured to transmit data to the power integrated local area network; a communication engine operably coupled with the peripheral device, and configured to control data transmission via the power integrated local area network; and an appliance network interface operably coupled with the communication engine, the appliance network interface being configured to transmit data to and to receive data from the power integrated local area network, data transfer between the peripheral device and the power integrated local area network being forwarded via the appliance network interface.

In accordance with another embodiment of the invention, a central network device for use in a power integrated local area network comprises: a housing; networking logic, enclosed by the housing, configured to communicate with a plurality of member network devices; an electrochemical power source, sharing the housing with the networking logic, for storing energy to provide power for the member network devices; and rectification circuitry, sharing the housing with the networking logic and the electrochemical power source, wherein the power integrated local area network is configured to execute the Ethernet protocol.

In a related method in accordance with an embodiment of the invention, a method for powering a local area network using power from a central network device comprises: housing an electrochemical power source in a common enclosure with networking logic configured to communicate with a plurality of member network devices; rectifying primary power that is delivered to the central network device, to charge the electrochemical power source; delivering power stored by the electrochemical power source to at least one of the plurality of member network devices; and executing the Ethernet protocol on the local area network.

BRIEF DESCRIPTION OF THE DRAWINGS

The foregoing description of various embodiments of the invention should be appreciated more fully from the following further description thereof with reference to the accompanying drawings wherein:

FIG. 3 schematically shows a network appliance that may be powered conveniently by a central network device, in accordance with an embodiment of the invention.

DESCRIPTION OF ILLUSTRATIVE EMBODIMENTS

Figure 1:
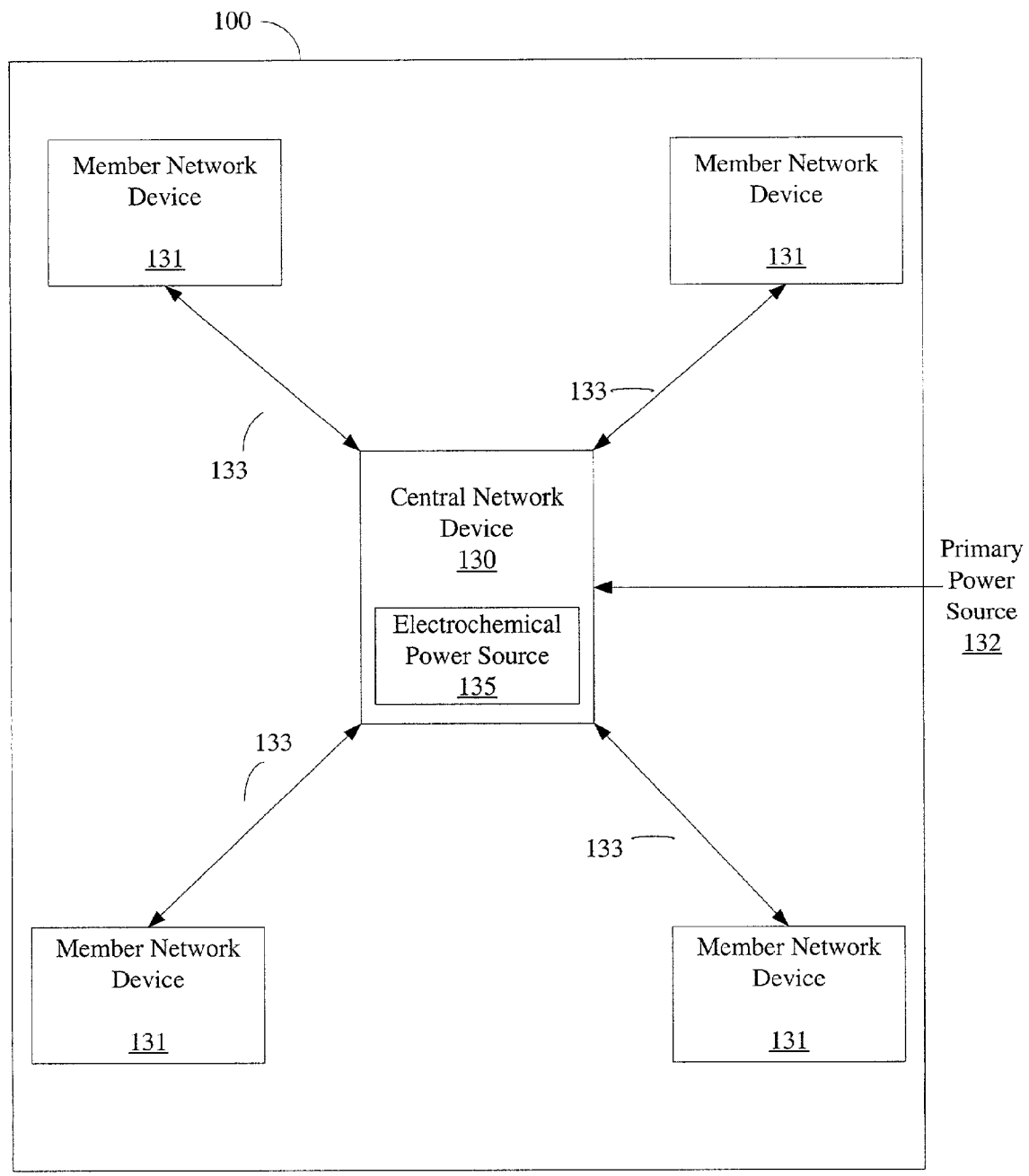
FIG. 1 schematically shows an arrangement, according to an embodiment of the invention, for delivering power to member network devices from a central network device.

FIG. 1 schematically shows an arrangement, according to an embodiment of the invention, for delivering power to member network devices 131 from a central network device 130. The embodiment of FIG. 1 features an electrochemical power source 135 that provides backup power for member network devices 131 in a local area network 100. This "turn-key" solution allows resilient power and data to be installed in many situations where local area networks, such as Ethernet networks, are not presently a viable alternative for a communications infrastructure. For example, as will be seen below, the embodiment of FIG. 1 allows backup power to be delivered to network appliances, whose small scale might otherwise make installation of multiple backup power sources impractical.

When a primary power source 132 fails to deliver a desired power level, combined power/data links 133 transmit backup power, from energy stored in the electrochemical power source 135, to member network devices 131. The local area network 100 may be of any type, and in one embodiment is an Ethernet network operating according to a CSMA/CD (Carrier Sense Multiple Access/Collision Detection Mechanism) Protocol. It should be noted that, like other details of illustrative embodiments provided herein, discussion of an Ethernet network is not intended to limit the invention to one embodiment. Accordingly, another embodiment of the invention may use another type of local area network. Also, a different number of member network devices 131 may be used than are shown in FIG. 1.

In one embodiment, the local area network 100 is a power integrated local area network. As used herein, the term "power integrated local area network" refers to a local network that transmits both power and data to member computer systems (e.g. network appliances, personal computers, or servers) in the network. Such power may or may not be used by the member computer systems. Among other ways, the power and data may be transmitted on a single cable via different wires, or via the same wire. Illustrative power integrated networks include Power Ethernet networks, which implement the proposed IEEE 802.3af Standard. At the time of filing, this standard is in draft form and is expected to be complete and adopted by late 2001. Computer systems utilizing this standard are capable of receiving power (e.g. about fourteen watts) and data from a computer cable across an IEEE DTE (Data Terminal Equipment) through a MDI-X (Media Dependent Interface) compliant port. In addition, a Power Ethernet network may determine whether devices coupled to the network are capable of receiving power from the network. It should be noted, however, that although Power Ethernet and the proposed IEEE 802.3af Standard are discussed, the invention should not be taken as limited to one embodiment using such standard. Another embodiment may use another type of power integrated local area network. It will also be understood that because Power Ethernet standards may change or be replaced by similar standards, the term "Power Ethernet Standard," as used herein and in the accompanying claims, signifies not only the IEEE 802.3af Standard, but also all other similar standards that operate according to like principles.

As will be described further below in connection with FIG. 3, the member network devices 131 are, in one embodiment, network appliances.

Figure 2:
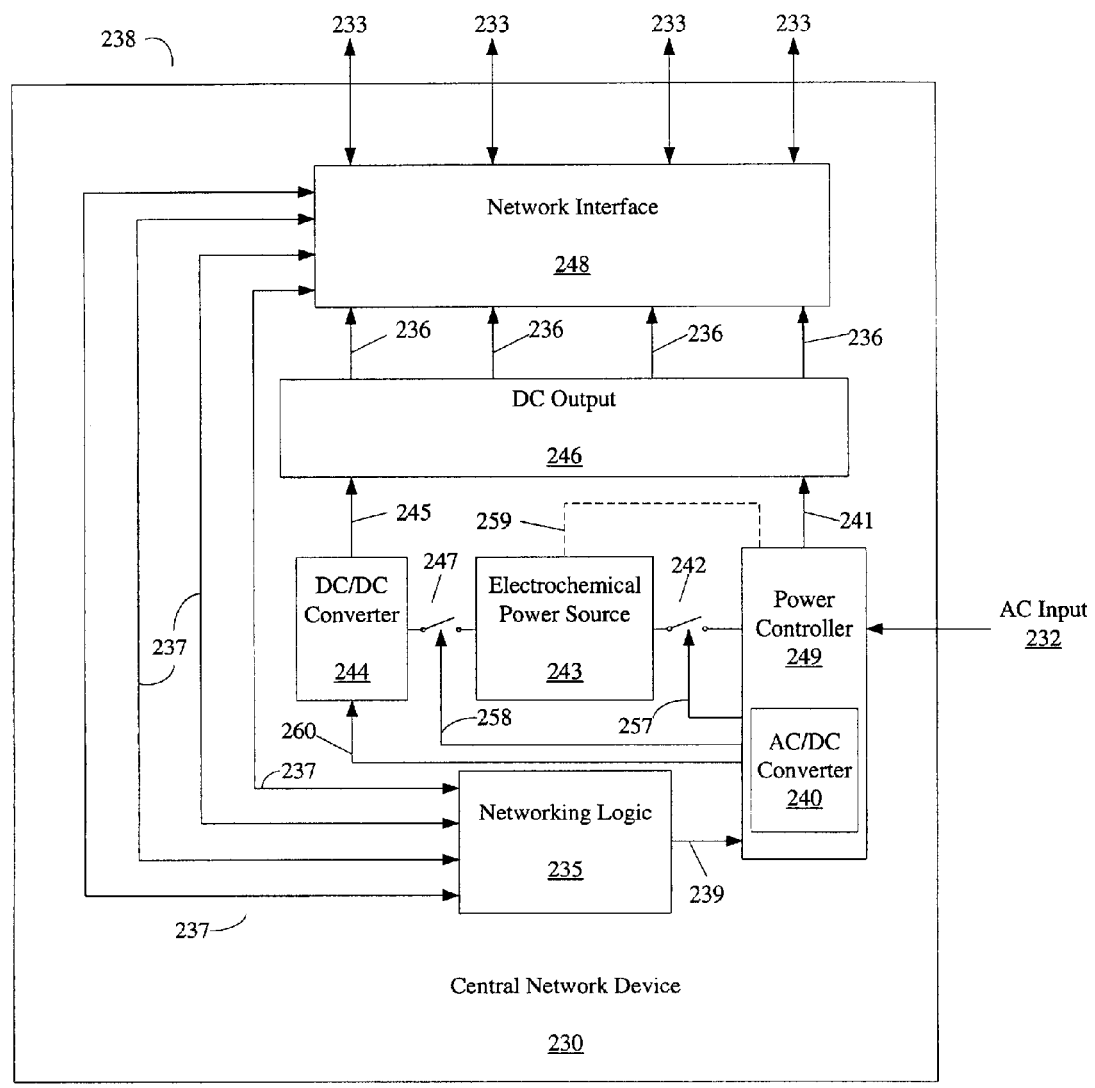
FIG. 2 schematically shows a central network device with electrochemical power source, according to an embodiment of the invention.

FIG. 2 illustrates in further detail a central network device according to an embodiment of the invention. The embodiment includes networking logic 235, an electrochemical power source 243, and power control and conversion circuitry 240, 244, 249, in a central network device 230.

The networking logic 235 may be, for example, a switch, a hub, a router, or a multiplexer. The electrochemical power source 243 may be, for example, a non-primary power source, in which a recharging process restores an electrochemical reaction, as opposed to a primary power source, which does not recharge. In particular, the electrochemical power source 243 may be a rechargeable battery. In an embodiment having a battery, the battery may be one of many different types including, for example, lithium ion, nickel cadmium, nickel metal hydride, and lead acid batteries; and the battery may possess one of many different electrical characteristics, such as trickle-charging or slow-charging. In one embodiment, the electrochemical power source 243 is a single battery, but in other embodiments it includes two or more electrically coupled batteries, or a battery bank.

In one embodiment, the components shown in FIG. 2 are housed within a common enclosure 238. For example, the components may be enclosed within a sealed panel unit for convenient installation. The common enclosure 238 may have an access door for servicing enclosed components such as batteries, or may form a disposable unit that is replaced as a whole when maintenance is necessary.

The components shown in FIG. 2 need not, however, be housed within a common enclosure 238. In another embodiment, for example, the electrochemical power source 243 has its own enclosure, which may also house power control and conversion circuitry 240, 244, and 249. In accordance with an embodiment of the invention, the components are functionally related as shown in FIG. 2, independent of the manner in which they are housed.

In an embodiment according to the invention, the central network device 230 is configured to selectively deliver power to member network devices, through combined power/data links 233. The central network device 230 determines which member network devices are capable of accepting power, by transmitting discovery signals over links 233 and receiving response signals from the member network devices. Networking logic 235, or another component of central network device 230, may transmit the discovery signals and receive the responses. A discovery method that may be used in an embodiment of the invention is discussed in "White Paper on the Subject of the AC Coupled Diode Discovery Method," by Rick Brooks, July 2000, available on the Internet at the time of filing, at:
http://grouper.ieee.org/groups/802/3/power_study/public/
email_attach/ac_coupled_diode_discovery_white-
_paper.pdf, the disclosure of which is hereby incorporated herein by reference.

Power controller 249 operates in two modes: a standby mode, in which the AC input 232 provides all of the power for the member network devices; and an electrochemical backup mode, in which the electrochemical power source 243 provides some or all of the power for the member network devices.

The power controller 249 determines a threshold power level that is required to be delivered to the member network devices that are capable of accepting power. In one embodiment, the threshold level varies depending on the number and type of member network devices that are capable of accepting power. The number and type of such member network devices may be determined using the discovery signal method discussed above, with networking logic 235 forwarding response signal information to the power controller 249 via data path 239.

If the AC input 232 delivers less power than the threshold power level, the power controller 249 operates in electrochemical backup mode; otherwise, in standby mode.

In standby mode, the power controller 249 feeds AC input 232 to an AC/DC converter 240. The AC/DC converter 240 rectifies the AC power to the DC voltage required by the member network devices that are capable of accepting power, and the power controller 249 delivers the rectified DC signal 241 to the central network device's DC output 246. The networking logic 235 processes data signals 237, with each signal 237 corresponding to one member network device. A network interface 248 combines a DC power signal 236 with a data signal 237, for each member network device that is capable of accepting power, and transmits the combined power/data signal to the member network device through combined power/data link 233. The network interface 248 also allows communication of data in the reverse direction, from a member network device to the networking logic 235, via combined power/data link 233 and data signal paths 237.

Also in standby mode, the power controller 249 coordinates any necessary recharging of electrochemical power source 243. The power controller 249 determines whether the electrochemical power source 243 needs recharging by using a sensing line 259; for example, by comparing the electrochemical power source 243's output voltage with a minimum voltage. Such a minimum voltage varies for different electrochemical power sources 243; for example, some batteries function best when they are cycled through low states of charge.

When recharging is necessary, the power controller 249 uses signal line 257 to close a charging switch 242, and signal line 258 to open a discharging switch 247. The power controller 249 keeps the charging switch 242 closed, thereby charging the electrochemical power source 243 with DC output from AC/DC converter 240, until sensing line 259 indicates an adequate state of charge, at which point the controller 249 opens the charging switch 242. The controller 249 keeps the discharging switch 247 open throughout standby mode.

In electrochemical backup mode, the power controller 249 uses signal line 257 to keep the charging switch 242 open. In one embodiment, the power controller 249 completely cuts off power delivery via the rectified DC signal 241, upon commencement of electrochemical backup mode. In this case, the controller 249 closes discharging switch 247, and electrochemical power source 243 provides all backup power to the member network devices, via a DC/DC converter 244 and a DC signal path 245.

Another embodiment allows power sharing between the AC input 232 and the electrochemical power source 243, when power from the AC input 232 has fallen below the threshold power level but has not cut completely. In such an embodiment, the power controller 249 determines how much power the AC input is supplying, as a proportion of the threshold power level. As described for standby mode, the power controller 249 feeds the AC input 232 to the AC/DC converter 240, so that some DC power is delivered via DC signal path 241. In addition, however, signal line 258 signals to close the discharge switch 247. The power controller 249 signals to DC/DC converter 244, via a DC/DC converter control line 260, to adjust the output of DC/DC converter 244 to complement the proportion of threshold power that is supplied by AC input 232. In this way, DC output 246 may combine DC outputs 241 and 245, to produce sufficient DC power for the member network devices that are capable of accepting power.

In one embodiment, the electrochemical power source 243 delivers its power directly to DC output 246. Preferably, however, it does so via the DC/DC converter 244 and DC signal path 245, since the DC/DC converter isolates the member network devices from any undesirable levels of DC voltage produced by the electrochemical power source 243. In electrochemical backup mode, as in standby mode, the network interface 248 combines DC power signals 236 with data signals 237 for delivery to member network devices that are capable of accepting power.

FIG. 3 schematically shows a network appliance 356 that may be powered conveniently by a central network device, in accordance with an embodiment of the invention. The network appliance 356 is configured to receive power via a power integrated network, such as an Ethernet network; and includes components configured to enable a peripheral device 355 to be interfaced via the power integrated network. The network appliance 356 is a specially configured network device that includes the peripheral device 355 for executing a specified function. In illustrative embodiments, the peripheral device 355 is interior to the network appliance 356. Peripheral devices 355 may, for example, control a door strike and access to a site, alert people in a building of an emergency, or simply record a temperature at a site. Additional examples of peripherals 355 include a speech recognition module, physical presence module, microphone, camera, display monitor, laser detector, light switch, thermostat, power outlet, and appliance controller (e.g., to control a kitchen appliance). Further examples of useful peripherals and network appliances that may used in accordance an embodiment of the invention may be found in U.S. patent application Ser. No. 09/699,543, entitled "Apparatus for Controlling a Premises from a Remote Location," filed Oct. 30, 2000. The disclosure of this commonly owned application is hereby incorporated herein by reference.

The network appliance 356 includes a local area network interface ("LAN interface 350"); a communication engine 352 to control data transmission across the local area network; and a power supply 351 to convert power received from the local area network for use by the network appliance 356. In addition, the appliance 356 also includes a peripheral controller 353 that is pre-configured with the logic to control the attached peripheral device 355, and a peripheral connector 354 for easily coupling the peripheral device 355 with the appliance 356. Further details concerning appliances such as network appliance 356 may be found in the above-referenced application Ser. No. 09/699,543.

Some embodiments of the invention may be implemented, at least in part, in any conventional computer programming language comprising computer program code. For example, preferred embodiments may be implemented, at least in part, in a procedural programming language (e.g., "C") or an object oriented programming language (e.g., "C++"). Alternative embodiments of the invention may be implemented, at least in part, as preprogrammed hardware elements (e.g., application specific integrated circuits, FPGAs, and digital signal processors), or other related components.

The present invention may be embodied in other specific forms without departing from the true scope of the invention. The described embodiments are to be considered in all respects only as illustrative and not restrictive.

What is claimed is:

1. A central network device for use in a power integrated local area network, the central network device comprising:
   a primary power supply;
   an electrochemical power source in the central networking device;
   discovery logic for discovering member network devices that are capable of accepting power over a combined power/data link and for determining a threshold power level for supporting discovered member devices that are capable of receiving power from combined power/data links; and
   a network interface configured to communicate with a plurality of discovered member network devices via a plurality of combined power/data links, each combined power/data link including at least one wire configured to deliver both power and data;
wherein the electrochemical power source is configured to assist the primary power supply to power the discovered member network devices over the plurality of combined power/data links when the primary power supply is able to deliver only a portion of the threshold power level to the plurality of discovered member network devices.

2. A central network device according to claim 1 wherein the power integrated local area network is configured to execute the Ethernet protocol.

3. A central network device according to claim 1, further comprising networking logic chosen from the group consisting of a switch, a hub, a router, and a multiplexer.

4. A central network device according to claim 1, wherein the power integrated local area network is configured to operate according to a Power Ethernet Standard.

5. A central network device according to claim 4, the central network device being configured to deliver power and data through an MDI-X compliant port.

6. A central network device according to claim 1, further comprising a housing shared by the electrochemical power source and the network interface.

7. A central network device according to claim 1, further comprising power rectification circuitry.

8. A central network device according to claim 7, further comprising an AC to DC converter.

9. A central network device according to claim 7, further comprising a DC to DC converter.

10. A central network device according to claim 1, wherein the electrochemical power source comprises a rechargeable battery.

11. A central network device according to claim 10, wherein the primary power supply is an Alternating Current power supply and the rechargeable battery is configured to be charged by an AC to DC converter coupled to the primary power supply.

12. A central network device according to claim 10, wherein the rechargeable battery is configured to provide power to a DC to DC converter, the DC to DC converter being configured to power the at least one selected member network device.

13. A central network device according to claim 1, wherein the plurality of discovered member network devices includes a network appliance.

14. A central network device according to claim 13, wherein the network appliance comprises:
a peripheral device configured to transmit data to the power integrated local area network;
a communication engine operably coupled with the peripheral device, the communication engine configured to control data transmission via the power integrated local area network, wherein the power integrated local area network includes links comprising wires, and wherein each wire simultaneously delivers both power and data; and
an appliance network interface operably coupled with the communication engine, the appliance network interface being configured to transmit data to and to receive data from the power integrated local area network via the combined power/data link, data transfer between the peripheral device and the power integrated local area network being forwarded via the appliance network interface.

15. A power integrated local area network, the network comprising:

a plurality of member network devices; and
a central network device configured to:
discover which of the plurality of member network devices are capable of receiving power on combined power/data links;
determine a threshold power level for powering a plurality of discovered member devices capable of receiving power on combined power/data links; and
communicate with a plurality of discovered member network devices via a plurality of combined power/data links, and to deliver both power and data to the plurality of discovered member network devices;
wherein the electrochemical power source is configured to assist a primary power supply that powers the plurality of discovered member network devices via combined power/data links when the primary power supply is able to provide only a portion of the threshold power level to the plurality of discovered member network devices.

16. A central network device for use in a power integrated local area network, the central network device comprising:
discovery logic, for identifying a plurality of discovered member network devices capable of communicating over combined power/data links, including logic for determining a threshold power level for communicating with the plurality of discovered member network device;
networking logic, configured to communicate with the plurality of discovered member network devices via a corresponding plurality of combined power/data links, the combined power/data links comprising at least one wire for simultaneously providing both power and data to the plurality of member network devices;
a primary power supply for providing power to the plurality of combined power/data links; and
electrochemical power source means for providing power to the combined power/data link in the power integrated local area network;
wherein the electrochemical power source is configured to assist the primary power supply when the primary power supply is able to provide only a portion of the threshold power level to the plurality of discovered member network devices.

17. A central network device according to claim 16, wherein the power integrated local area network is configured to execute the Ethernet protocol.

18. A central network device according to claim 16, wherein the networking logic is chosen form the group consisting of a switch, a hub, a router, and a multiplexer.

19. A central network device according to claim 16, wherein the power integrated local area network is configured to operate according to a Power Ethernet Standard.

20. A central network device according to claim 19, the central network device being configured to deliver power and data through an MDI-X compliant port.

21. A central network device according to claim 16, further comprising a housing shared by the electrochemical power source means and the networking logic.

22. A central network device according to claim 16, further comprising power rectification circuitry.

23. A central network device according to claim 22, further comprising an AC to DC converter.

24. A central network device according to claim 22, further comprising a DC to DC converter.

25. A central network device according to claim 16, wherein the electrochemical power source means comprises a rechargeable battery.

26. A central network device according to claim 25, wherein the rechargeable battery is configured to be charged by an AC to DC converter coupled to the primary power supply.

27. A central network device according to claim 25, wherein the rechargeable battery is configured to provide power to a DC to DC converter, the DC to DC converter being configured to power the at least one selected member network device.

28. A central network device according to claim 16, wherein the plurality of member network devices comprises a network appliance.

29. A central network device according to claim 28, wherein the network appliance comprises:
 a peripheral device configured to transmit data to the power integrated local area network;
 a communication engine operably coupled with the peripheral device, the communication engine configured to control data transmission via the power integrated local area network; and
 an appliance network interface operably coupled with the communication engine, the appliance network interface being configured to transmit data to and to receive data from the power integrated local area network, data transfer between the peripheral device and the power integrated local area network being forwarded via the appliance network interface.

30. A method for powering a local area network using power from a central network device, the method comprising:
 discovering at least one member network device capable of accepting power over the local area network on a combined power/data link in the local area network, the combined power/data link including at least one wire for simultaneously providing both power and data to the at least one member network device;
 determining a threshold power level for powering a plurality of discovered member devices capable of receiving power on combined power/data links; and
 providing assist power, from energy stored by an electrochemical power source in the central network device, to the at least one selected member network device via the combined power/data link in the event that a primary power supply is able to provide only a portion of power required by the at least one member network device.

31. A method according to claim 30, wherein the method comprises:
 executing the Ethernet protocol on the local area network.

32. A method according to claim 30, wherein the method comprises:
 housing the electrochemical power source in a common enclosure with networking logic chosen from the group consisting of a switch, a hub, a router, and a multiplexer.

33. A method according to claim 30, wherein the method comprises:
 operating the local area network according to a Power Ethernet Standard.

34. A method according to claim 33, wherein the method comprises:
 delivering power and data through an MDI-X compliant port.

35. A method according to claim 30, wherein the method comprises:
 housing rectification circuitry in a common enclosure with the electrochemical power source.

36. A method according to claim 35, wherein the method comprises:
 housing an AC to DC converter in the common enclosure.

37. A method according to claim 35, wherein the method comprises:
 housing a DC to DC converter in the common enclosure.

38. A method according to claim 30, wherein the method comprises:
 housing a rechargeable battery in a common enclosure with networking logic.

39. A method according to claim 38, wherein the method comprises:
 charging the rechargeable battery with an AC to DC converter.

40. A method according to claim 38, wherein the method comprises:
 delivering power from the rechargeable battery to a DC to DC converter; and
 delivering power from the DC to DC converter to the at least one selected member network devices.

41. A method according to claim 30, wherein the method comprises:
 delivering power from the electrochemical power source to a network appliance.

42. A method according to claim 41, wherein the method comprises delivering power to a network appliance that comprises:
 a peripheral device configured to transmit data to the local area network;
 a communication engine operably coupled with the peripheral device, the communication engine configured to control data transmission via the local area network; and
 an appliance network interface operably coupled with the communication engine, the appliance network interface being configured to transmit data to and to receive data from the local area network, data transfer between the peripheral device and the local area network being forwarded via the appliance network interface via combined power data links, each of the combined power/data links including at least one wire for simultaneously delivering both power and data to the plurality of member network devices.

43. A central network device for use in a power integrated local area network, the central network device comprising:
 a housing;
 networking logic, enclosed by the housing, configured to:
  discover a plurality of member network devices capable of receiving power over combined power/data links;
  determine a threshold power level required to power the plurality of member network devices capable of receiving power of combined power/data links; and
  communicate with a plurality of member network devices via a plurality of combined power/data links, each of the combined power/data links including at least one wire for simultaneously delivering both power and data to the plurality of member network devices;
 an electrochemical power source, sharing the housing with the networking logic, for storing energy to provide power for the plurality of member network devices to assist a primary power supply when the primary power supply is able to provide only a portion of the threshold power level; and rectification circuitry, sharing the housing with the networking logic and the electrochemical power source, wherein the power integrated local area network is configured to execute the Ethernet protocol.

44. A method for powering a local area network using power from a central network device, the method comprising:

housing an electrochemical power source in a common enclosure with networking logic configured to communicate with a plurality of member network devices via a plurality of combined power/data links, each of the combined power/data links including at least one wire for simultaneously delivering both power and data to the plurality of member network devices;

rectifying primary power that is delivered to the central network device, to charge the electrochemical power source;

delivering power stored by the electrochemical power source to at least one member device of the plurality of member network devices via at least one of the combined power/data links of the plurality of power/data links to assist the primary power when the primary power is able to provide only a portion of a threshold power for the combined power/data links; and executing the Ethernet protocol on the local area network.

* * * * *